United States Patent
Stewart

[15] 3,637,285
[45] Jan. 25, 1972

[54] REFLEX LIGHT REFLECTOR

[72] Inventor: Marshall E. Stewart, Redondo Beach, Calif.
[73] Assignee: Stewart Filmscreen Corp., Torrance, Calif.
[22] Filed: June 23, 1970
[21] Appl. No.: 49,029

[52] U.S. Cl. .................................... 350/105, 350/188
[51] Int. Cl. ............................................. G02b 5/12
[58] Field of Search ............ 350/188, 276, 283, 117, 123, 350/126, 97–109

[56] References Cited

UNITED STATES PATENTS

| | | | |
|---|---|---|---|
| 3,249,947 | 5/1966 | Williams | 350/105 |
| 3,176,584 | 4/1965 | De Vries et al. | 350/105 |
| 2,706,262 | 4/1955 | Barnes | 350/97 |

Primary Examiner—David Schonberg
Assistant Examiner—Michael J. Tokar
Attorney—Shoemaker & Mattare

[57] ABSTRACT

A reflex light reflector comprising a reflective screen for reflecting both paraxial and normal rays and having a diffusion coating applied to the surface thereof for dispersing light rays reflected by said screen.

9 Claims, 2 Drawing Figures

PATENTED JAN 25 1972

3,637,285

INVENTOR
MARSHALL E. STEWART

BY Shoemaker and Mattare
ATTORNEYS

REFLEX LIGHT REFLECTOR

BACKGROUND OF THE INVENTION

This invention relates to a reflex light reflector which reflects both paraxial and normal rays back to their source even though the rays of light strike the reflex light reflector at an angle. The reflex light reflector comprises a layer of contiguous small transparent spheres or glass beads overlying a light reflecting means and held in position by a binding means, said beads refracting and collimating the light so that an incident beam or ray of light is selectively returned toward the source as a cone of light even though the incident light strikes at an angle.

Such reflex light reflectors have been used in highway signs, advertising signs, photography, and the like, but heretofore, these reflex light reflectors have not been suitable for use in projection screens due to "hot spots" of light radiation caused by the reflection of light striking the reflex-reflector in a narrow zone or cone of brilliant light. Generally, in such prior art reflex light reflectors, the light reflected by the reflex light reflector is reflected in a cone of light having an included angle of approximately 1°.

The present invention, by providing a diffusion coating on the reflex light reflector, eliminates the "hot spots" of light radiation by diffusing or dispersing the reflected light over a wider zone than is possible with prior art devices thus rendering the reflex light reflector suitable for use in projection screens. The reflected light in the present invention is dispersed over an angle of approximately 5° to 6°, and a person or instrument is thus enabled to receive the reflected image in a larger zone of even illumination. This increase in the angle of dispersion is important when viewing the reflected image from a position close to the reflex light reflector in order to achieve equal brilliance to both eyes of the viewer. In other words, for distant viewing, 1° of divergence of the reflected light is satisfactory since the light reflected by the reflex light reflector will not be diffused to an extent sufficient to blur or dim the reflected image; but for close viewing, 1° of divergence is not satisfactory since the reflected image will not have equal brilliance over the complete surface of the reflex reflector screen and will not appear equally brilliant in both eyes of an observer due to the concentration of the reflected rays in small zones. By diverging the rays over 5° or 6° of reflection, a viewer near the reflex light reflector will see the reflected image with equal brilliance over the entire area of the screen and the reflected image will appear equally brilliant in both eyes of the viewer, near or distant.

OBJECTS OF THE INVENTION

It is an object of this invention to provide a reflex light reflector having a diffusion coating for diffusing or dispersing reflected light rays over a wider zone of illumination than in prior art reflex light reflectors.

DETAILED DESCRIPTION OF THE INVENTION

Figure 1:
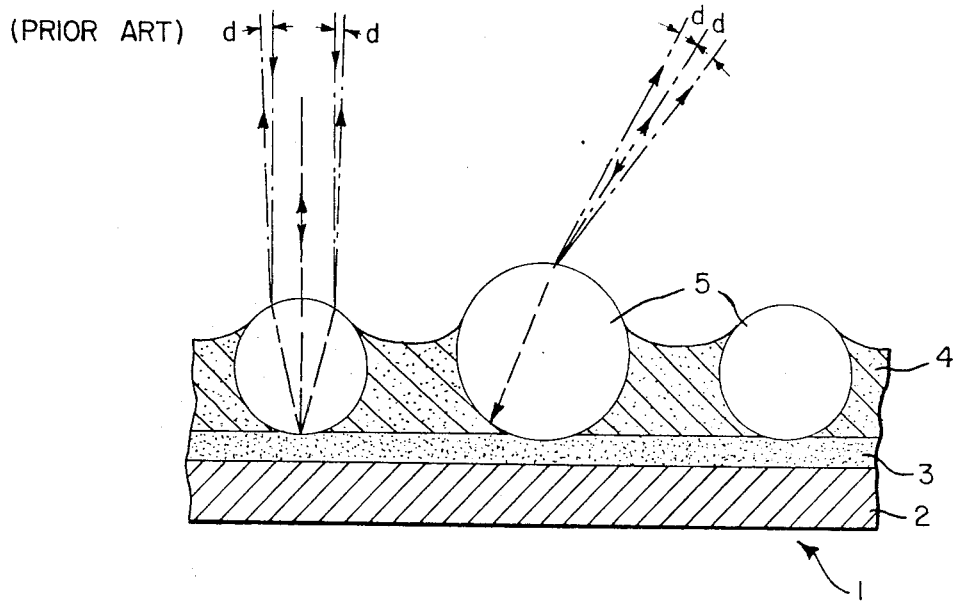
FIG. 1 is an enlarged view in section of a prior art reflex light reflector illustrating the small amount of dispersion of reflected light rays.

Referring now to the drawings wherein like reference numerals refer to like parts throughout the several views, the reflex light reflector or reflex-reflective screen is indicated generally at 1. The reflex-reflective screen, per se, is well known, and is described in detail in U.S. Pat. Nos. 2,379,741 and 2,294,930. Basically, the reflex-reflective screen comprises a rigid or flexible backing 2 comprising a plastic or waterproofed paper or the like over which is applied an opaque layer of material 3 selected to reduce interference of reflected light rays. In its preferred form, the opaque layer is black and any suitable material, such as carbon black or the like may be effectively applied over any binder. A metallic reflective layer 4 is superimposed over the opaque layer 3 and is applied by vacuum metallizing or the like to achieve a uniform highly reflective coating. A plurality of contiguous extremely fine spherical glass or resinous beads 5 on the order of 3 to 10 mils in diameter are pressed into and bonded to the metallized coating 4. As shown in the drawings and solely for the purpose of clarity, these beads are greatly enlarged and are illustrated spaced apart and arranged in a row, although it is to be understood that they are in fact disposed in somewhat random relationship one behind the other and in contiguous relationship in a layer on the surface of the reflex-reflector. Each sphere or bead 5 comprises a lens which returns the light to its source. The refractive index of the beads is selected such as to give the desired amount of divergence and brilliancy to the reflected image and is usually on the order of approximately 1.65, although it is to be understood that much lower or much higher refractive indexes may be used depending upon the intended use for the reflex-reflective screen.

The structure thus far described is conventional in the art, and as can be seen in FIG. 1, paraxial rays of light striking the reflex-reflective screen are refracted by the glass beads and reflected back toward their source with an angle of divergence $d$ on the order of approximately 1°. Rays of light striking the reflex-reflective screen at an angle are similarly refracted and reflected back toward their source with an angle of divergence $d$.

Figure 2:
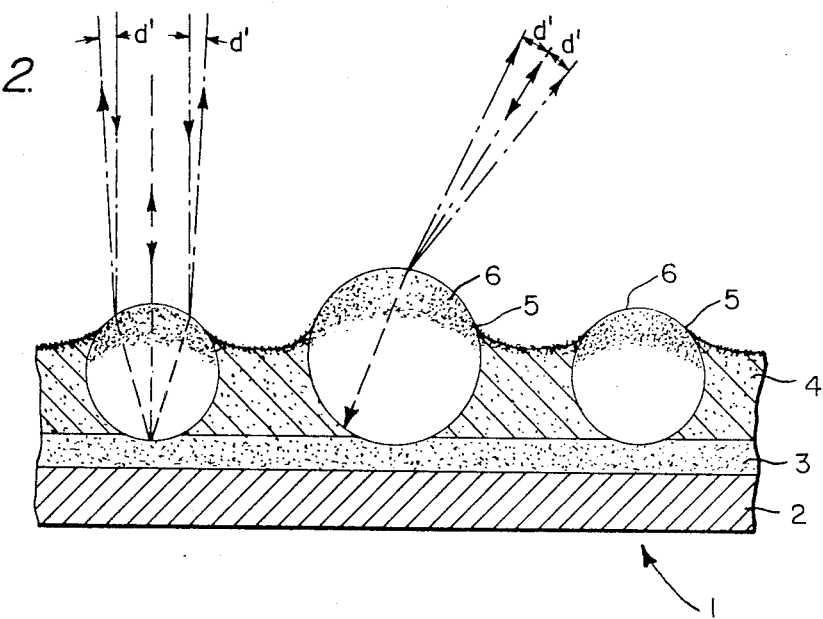
FIG. 2 is an enlarged view in section of a reflex light reflector having a diffusion coating applied to the surface thereof and showing the increased dispersion of light rays reflected thereby.

Referring now specifically to FIG. 2, the present invention comprises applying a diffusion coating 6 to the surface of the reflex-reflective screen 1. The diffusion coating comprises a flatting agent such as pyrogenated silica dispersed in a lacquer solution and applied evenly to the surface of the screen. The coating can be applied either by air gun or by other means, any device being suitable that will achieve an even coating or coatings of diffuse material on the screen. The lacquer solution used can be of any type of clear lacquer solution such as vinyl acetate, vinyl copolymer, acrylic, nitrocellulose, soya, ethyl cellulose, butyrate, or any other compatible combination of clear lacquers.

The flatting agent can be selected from any material having a low-refractive index such as pyrogenated silica, nondelaquescent silica gel, powdered glass, or any other very fine material used in the paint and lacquer industry as flatting agents. The particle size of the flatting agent should be selected such as to pass through a 325-mesh screen for uniformity and sharp definition of the projected and reflected image. The correct amount of diffusion is controlled by formulation of the diffused lacquer and it's viscosity. A single coat or a plurality of coats can be applied to the screen to obtain the correct amount of light dispersion. A laboratory-type light meter which is more sensitive than a camera-type light meter can be used to ascertain the degree of dispersion of the reflected light from the reflex-reflective screen.

As can be seen in FIG. 2, the rays of light striking the reflex-reflective screen are refracted by the glass beads 5 and are reflected back toward their source with an angle of divergence $d'$ on the order of 5° or 6° thus resulting in an image which will have equal brilliance in each eye of an observer positioned near the reflex-reflective screen.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. A reflex-reflective screen comprising, a backing, a layer of light-reflective material on said backing, a plurality of small transparent spherical beads embedded in the layer of reflective material for refracting and reflecting back toward its source a projected beam of light passing through the spheres, and a light diffusion coating overlying the surface of said beads and layer of reflective material for increasing the angle of dispersion of light reflected thereby.

2. A reflex-reflective screen as in claim 1, wherein said backing is flexible.

3. A reflex-reflective screen as in claim 1, wherein a layer of opaque material is interposed between the backing and the reflective layer.

4. A reflex-reflective screen as in claim 3, wherein the reflective layer comprises a metallic material.

5. A reflex-reflective screen as in claim 4, wherein the small spheres comprises glass beads.

6. A reflex-reflective screen as in claim 1, wherein the diffusion coating comprises a flatting agent dispersed in a lacquer solution and applied evenly to the surface of the screen.

7. A reflex-reflective screen as in claim 6, wherein the lacquer solution is selected from the group consisting of vinyl acetate, vinyl copolymer, acrylic, nitrocellulose, soya, ethyl cellulose and butyrate.

8. A reflex-reflective screen as in claim 7, wherein the flatting agent is selected from the group consisting of pyrogenated silica, nondelaquescent silica gel and powdered glass.

9. A reflex-reflective screen refracting and reflecting a beam of light projected onto the screen back to its source comprising, a substantially flat planar backing, a layer of opaque material on said backing, a layer of light-reflective material on said opaque layer, a plurality of small transparent spherical beads embedded in said layer of light-reflective material, and a coating of light diffusing material over the exposed surface of said beads and said layer of reflective material for eliminating hot spots in light reflected and refracted by said screen.

* * * * *